United States Patent [19]

Kennedy

[11] 4,190,637
[45] Feb. 26, 1980

[54] GRAPHITE HAVING IMPROVED THERMAL STRESS RESISTANCE AND METHOD OF PREPARATION

[75] Inventor: Charles R. Kennedy, Oak Ridge, Tenn.

[73] Assignee: The United States of America as represented by the United States Department of Energy, Washington, D.C.

[21] Appl. No.: 925,721

[22] Filed: Jul. 18, 1978

[51] Int. Cl.² .............................................. C01B 31/04
[52] U.S. Cl. .................................... 423/448; 264/29.5
[58] Field of Search ....................... 423/448, 445, 449; 264/29.5

[56] References Cited

U.S. PATENT DOCUMENTS

| 3,517,092 | 6/1970 | Peterson | 264/29.5 |
| 3,563,705 | 2/1971 | Grindstaff et al. | 423/448 |
| 3,957,957 | 5/1976 | Newman et al. | 423/448 |
| 4,091,196 | 5/1978 | Smith et al. | 526/73 |

FOREIGN PATENT DOCUMENTS 1117606  6/1968  United Kingdom .

OTHER PUBLICATIONS

Chard et al., "Graphite Processing Technology" ACS Symposium Serials, No. 21, Chapter 14, 1974, pp. 155-171.
Paluzelle et al., "The Development and Fabrication of Carbon Composites, Special Graphite, and Precursor Materials," AFML-TR-127, Jan. 5, 1977, pp. 1-24.
Whittaker et al., Carbon, vol. 7, pp. 615-621, 1969.
Fitzer et al., 11th Biennial Conference on Carbon (1973), pp. 67-68.
Fitzer et al., 12th Biennial Conference on Carbon (1975), pp. 243-244.
Kennedy, "The Use of Sulfur to Control Physical Properties in Graphite", 13th Biennial Conf. on Carbon, Jul. 18-22, 1977.
Tucker et al., "Puffing of Electrode Stock as Influenced by Sulfur Content and Heating Rate", 13th Biennial Conference on Carbon, Jul. 18-22, 1977.
12th Biennial Conference on Carbon Extended Abstracts and Program, Jul. 28-Aug. 1, 1975, pp. 241-242, 255-256, 305-306.

Primary Examiner—Edward J. Meros
Attorney, Agent, or Firm—R. V. Lupo; Stephen D. Hamel; Allen H. Uzzell

[57] ABSTRACT

An improved method for fabricating a graphite article comprises the steps of impregnating a coke article by first heating the coke article in contact with a thermoplastic pitch at a temperature within the range of 250°-300° C. at a pressure within the range of 200-2000 psig for at least 4-10 hours and then heating said article at a temperature within the range of 450°-485° C. at a pressure of 200-2000 psig for about 16-24 hours to provide an impregnated article; heating the impregnated article for sufficient time to carbonize the impregnant to provide a second coke article, and graphitizing the second coke article. A graphite having improved thermal stress resistance results when the coke to be impregnated contains 1-3 wt.% sulfur and no added puffing inhibitors. An additional improvement in thermal stress resistance is achieved when the second coke article is heated above about 1400° C. at a rate of at least 10° C./minute to a temperature above the puffing temperature.

10 Claims, 6 Drawing Figures

GRAPHITE HAVING IMPROVED THERMAL STRESS RESISTANCE AND METHOD OF PREPARATION

BACKGROUND OF THE INVENTION

This invention was made in the course of, or under, a contract with the United States Department of Energy. It relates in general to preparation of graphite and more particularly to the preparation of graphite having extremely high thermal stress resistance. Graphite is a porous material with two defect distributions to consider in the continuum mechanical approach to fracture. The first defect is the large pore associated with particle boundaries. The second defect is the microporosity which extends on a fine scale distributed within the particulate and crystallites. The generally accepted model is that the large pores initiate a crack that propagates from pore to pore normal to the stress axis and constitute the critical defect. Microcracking, however, begins well below the failure stress and increases in number with increasing applied stress. The ability of graphite to achieve large strains to failure is limited by the ability of the structure to accommodate microcracking without resulting in rapid crack propagation to failure. This microcracking is actually a stress relief system which distinguishes graphite from classically brittle ceramic materials.

In the prior art manufacture of graphite, e.g. electrodes, a coke of low sulfur content is generally the preferred raw material. Low sulfur coke is used to reduce the sudden irreversible expansion upon heating to graphitization. This phenomenon results from evolution of sulfur-containing gases from the coke, and is known as "puffing." A number of methods have been used in the prior art to prevent the puffing, for example, adding a puffing inhibitor such as an iron or calcium compound in combination with $TiO_2$ or $ZrO_2$, disclosed in U.S. Pat. No. 3,563,705. Puffing generally occurs only in thermoplastic pitches containing sulfur. In thermosetting materials, such as bitumen and thermosetting pitches, the presence of sulfur does not result in significant puffing and increases the coefficient of thermal expansion; see, for example, U.K. Pat. No. 1,117,606 issued to the United Kingdom Atomic Energy Authority, June 9, 1968. An increased coefficient of thermal expansion is undesirable in high-temperature applications where dimensional stability is important.

SUMMARY OF THE INVENTION

It is an object of this invention to provide an improved graphite fabrication process comprising a two-stage pressure impregnation step. It is a further object to provide a method of fabricating graphite having a low coefficient of thermal expansion, a high compressibility, high strain to failure, and acceptable mechanical strength. A further object is to provide a graphite having enhanced thermal stress resistance.

These and other objects are achieved according to this invention in a method for fabricating a graphite article comprising the steps of:

a. providing a first coke article;

b. impregnating said first coke article with a thermoplastic pitch by first heating said first coke article in contact with said thermoplastic pitch at a temperature within the range of 250°-300° C. at a pressure within the range of 200-2000 psig for at least 4-10 hours and then heating said article at a temperature within the range of 450°-485° C. at a pressure of 200-2000 psig for about 16-24 hours to provide an impregnated article;

c. heating said impregnated article for sufficient time to carbonize the impregnant to provide a second coke article; and d. graphitizing the second coke article.

A substantial improvement in thermal stress resistance is obtained when the first coke article contains 1-3 wt.% sulfur and no added puffing inhibitors. An additional improvement in thermal stress resistance is obtained if the second coke article is heated at a heating rate of at least 10° C. per minute from about 1400° C. to a temperature above the temperature at which puffing occurs. Graphite having improved thermal stress resistance is prepared by the method of this invention.

BRIEF DESCRIPTION OF THE FIGURES OF DRAWING

DETAILED DESCRIPTION

Figure 1:
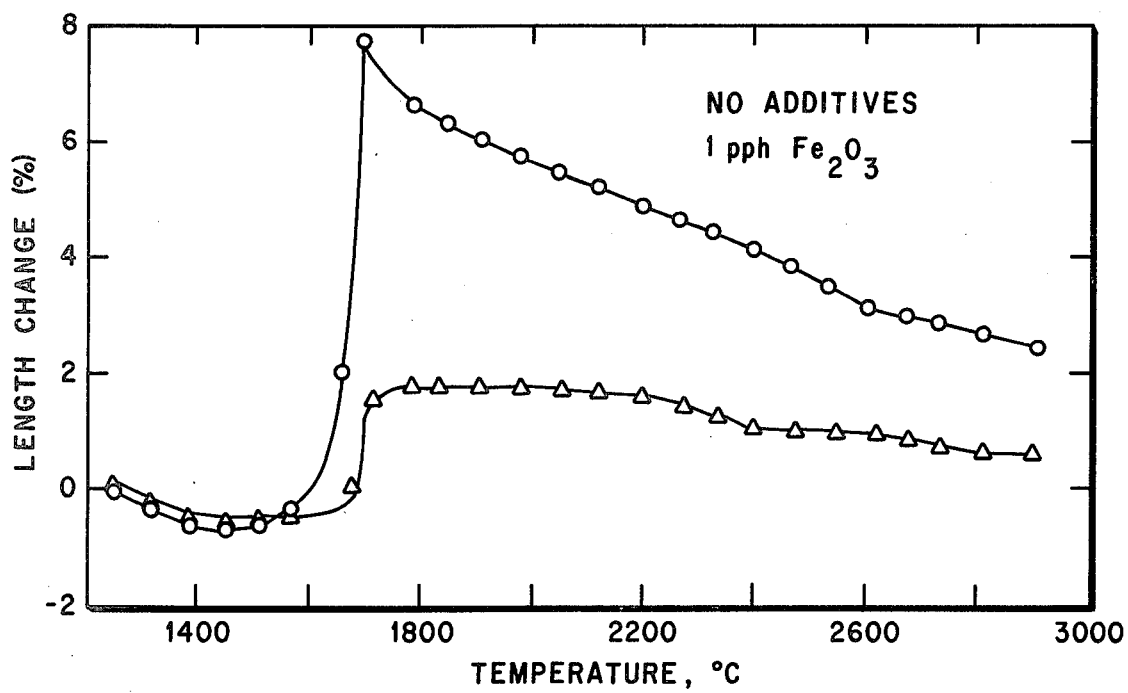
FIG. 1 is a graph of length change as a function of temperature for the graphitization of coke obtained from pitch containing 2.5 wt.% sulfur.
Figure 2:
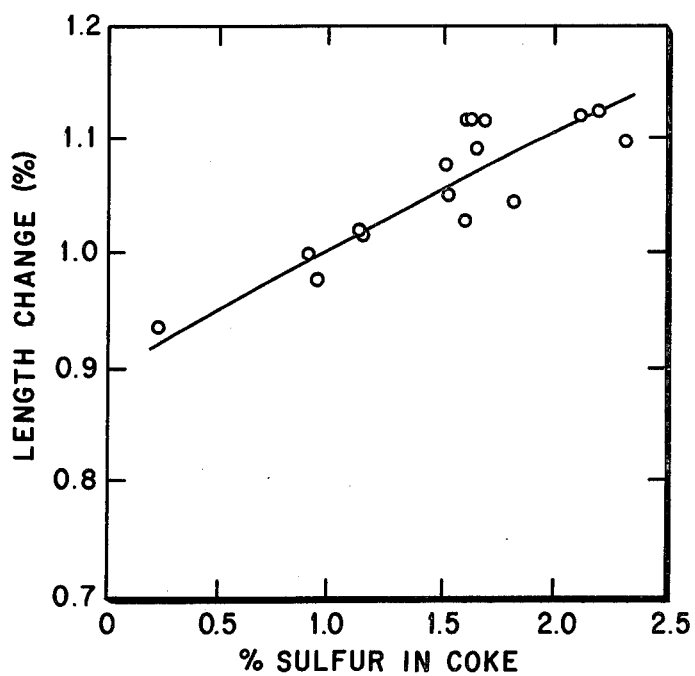
FIG. 2 is a graph of fracture strain in graphite prepared according to this invention as a function of sulfur content in the coke used in molding prior to impregnation.
Figure 5:
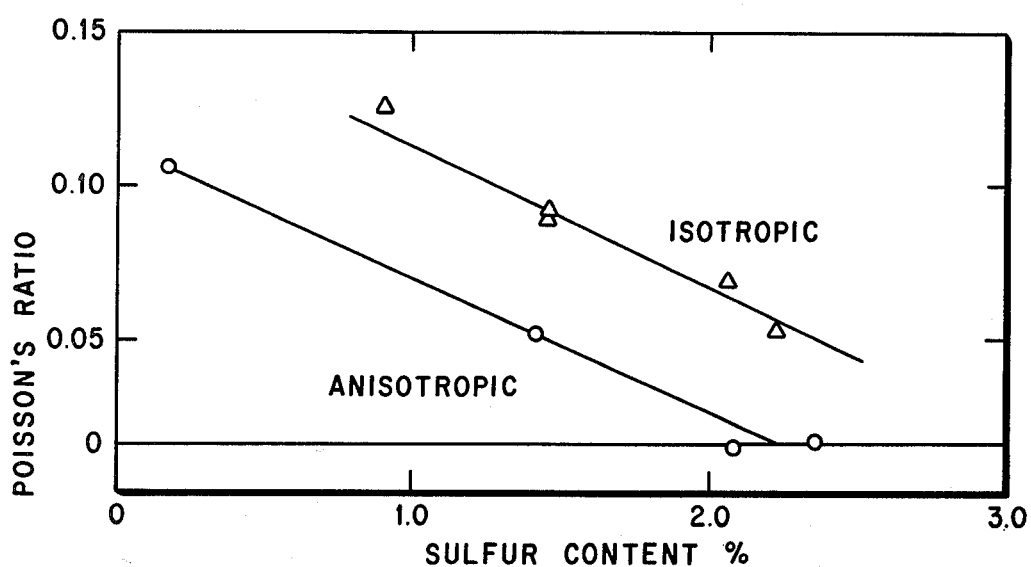
FIG. 5 is a graph of Poisson's Ratio of the graphite of this invention as a function of sulfur content in isotropic (two recoking steps) and anisotropic (no recoking steps) cokes.
Figure 3:
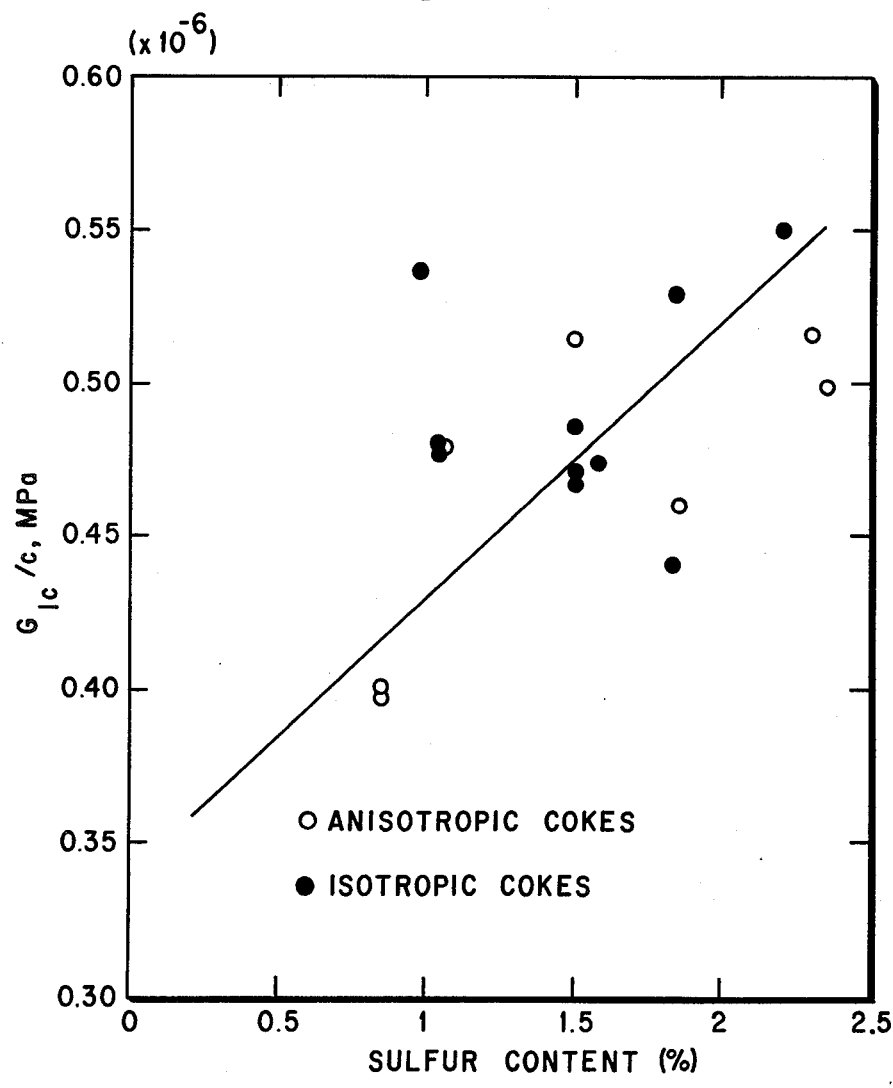
FIG. 3 is a graph of fracture toughness of the graphite of this invention as a function of sulfur content in isotropic (two recoking steps) and anisotropic (no recoking steps) cokes.
Figure 4:
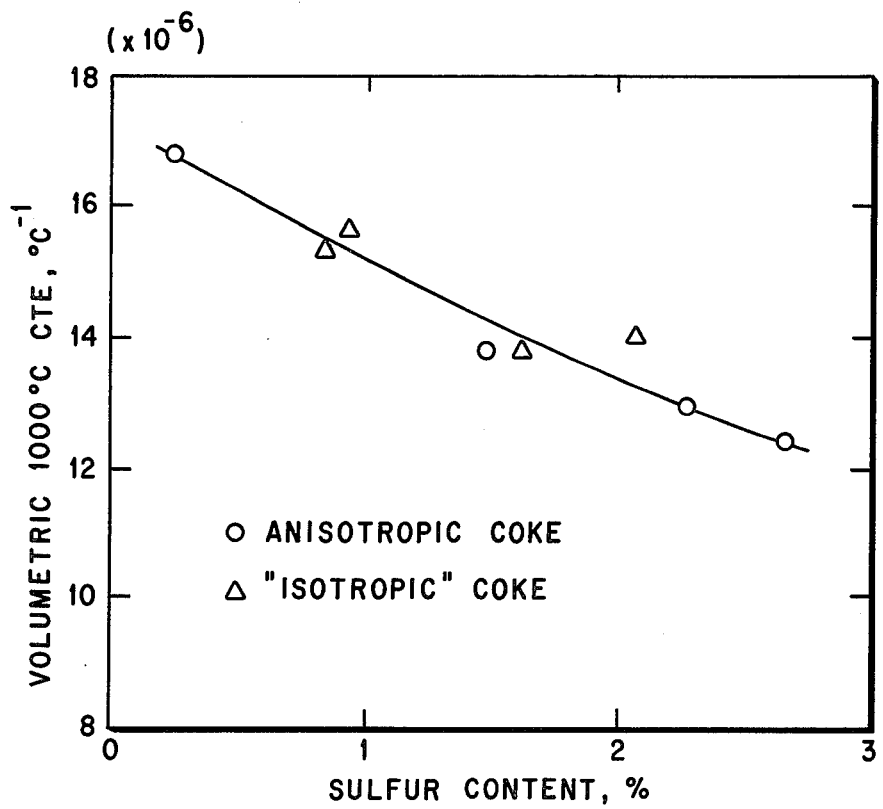
FIG. 4 is a graph of volumetric CTE of the graphite of this invention as a function of sulfur content in isotropic (two recoking steps) and anisotropic (no recoking steps) cokes.

According to this invention, it has been found that the thermal stress resistance of graphite can be improved significantly by structural control during fabrication resulting in the reduction of the critical defect size thereby providing increased resistance to crack propagation and by the introduction of a fine homogeneously distributed microporosity within the structure. It has been found that the desired microporosity can be provided in part by the phenomenon of "puffing". As used herein, "puffing" is defined as the irreversible expansion, created as a result of the sudden release of sulfur. As shown in FIG. 1, puffing occurs at a well-defined temperature, i.e. the puffing temperature. The effect of one part per hundred of $Fe_2O_3$ as an added puffing inhibitor is also shown.

Though the bulk density is described by the puffing phenomenon, the large pores which define the critical defect are neither increased in size or number. Since the critical defect is unaltered by puffing, the mechanical strength remains essentially unchanged. The strain-to-failure, however, is significantly increased, greatly enhancing the toughness and thermal shock resistance. In addition the coefficient of thermal expansion is described, partly due to the fact that the microporosity induced by the puffing is oriented normal to the c axis of the graphite. Increased sulfur content in graphite precursors has also been found to decrease Poisson's Ratio, indicating that a significant fraction of strain in such graphites is a result of void openings or closures.

The coke article impregnated according to my process can be prepared from highly acicular commercially available filler cokes. In order to provide better quality control, however, it is preferred that the filler coke be prepared from thermoplastic precursors. Suitable precursors are thermoplastic pitches, such as petroleum or coal tar pitches, thermal tars, decant oils, etc. The precursors should be low in inorganic impurities, being at least 98% benzene soluble, or 99% quinoline soluble, and can contain up to about 4% sulfur. The preferred thermoplastic pitch for all steps in this process other than the 300°-350° C. bindering step is A-240 pitch, a product of Ashland Oil Company, described more fully in the publication "Properties of Carbon Derived from Petroleum Pitches" by Horne, et al; report Y-1875 of the Y-12 Plant, Oak Ridge, Tenn.; available from the National Technical Information Service, Springfield, Va., which is herein incorporated by reference.

Since pitches are commercially avilable having a variety of sulfur contents, the required sulfur content in the filler coke or the coke article can be achieved by combining pitches. Some loss of sulfur will occur due to various reactions during coking etc. The desired degree of puffing, according to this invention, is achieved when the coke article prior to the impregnation step contains about 1–3wt.% sulfur with about 1.6–1.75 wt.% appearing to give the best combination of mechanical properties. Since the sulfur content of the filler coke is inversely related to the bulk density of the graphite product, the desired sulfur content for many applications may be dictated by density constraints rather than by mechanical properties, or example, in applications as nuclear moderator material. Though the prior art attempted to minimize the puffing phenomenon by the addition of inhibitors, the coke used in the present invention contains no added puffing inhibitors, i.e. none not already present in the coke or pitch precursor as impurities.

A measure of improvement in thermal stress resistance can be achieved by narrowing the particle size distribution of the filler coke particles. By using only coke particles smaller than about 90 micrometers in the initial stage of coke preparation, optical domains in the graphite product are reduced. It is also desirable to eliminate coke fines which form agglomerates thereby increasing the critical defect size. The desired filler coke particle size distribution is all less than 90 micrometers with an average particle diameter (quivalent area diameter) of between 20–40 microns. This can be achieved by grinding filler coke and collecting the fraction which passes through a 90 micrometer mesh but is retained on about a 40 micrometer mesh, since a substantial quantity of particles smaller than 40 micrometers is retained on a 40 micrometer mesh.

Figure 6:
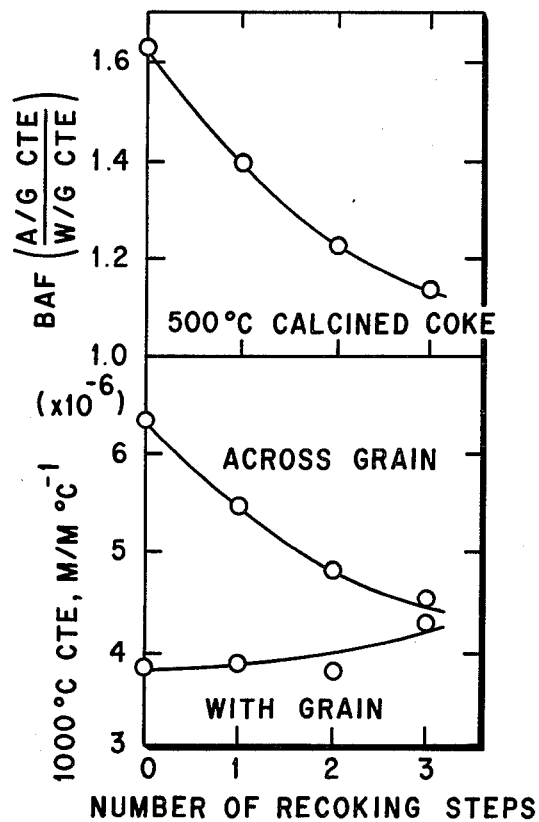
FIG. 6 is a graph of Bacon Anisotropy Factor and Coefficient of Thermal Expansion of the graphite of this invention as a function of the number of recoking steps used in the preparation of coke articles.

One method of reducing anisotropy in graphites is by the use of multiple recoking steps. According to this procedure, ground filler coke is combined with thermoplastic graphite precursors such as pitch and heated under coking conditions in an inert atmosphere such as nitrogen or argon to a temperature of about 505°–525° C. to cause fusion. The fused mass is cooled, fragmented, combined with additional thermoplastic precursor, and again heated to fusion temperature. The particle size of the recoking steps is not critical. The orginal <90 micrometer coke particles act as seed for the deposition of additional coke. The fragmentation steps tend to produce larger particles than the original particles due to the increasing amount of coke being deposited. For the recoking steps it is preferred that the particles be less than about 110 micrometers. After each recoking step, the coke becomes more isotropic. When recoking steps are performed, the sulfur content of the article to be graphitized can be controlled in either of two ways; first, by mixing precursor materials of known sulfur content to provide the initial coking precursor; and second, by using precursors of different sulfur contents in recoking steps. It has been found that both methods produce the same trend and results, however, control of sulfur by recoking precursors seems to give slightly higher coefficient of thermal expansion values than control of sulfur in the precursor mixture. FIG. 6 shows the effect of the recoking steps on the isotropy of the graphite of this invention. Not only does the isotropy increase but the across grain coefficient of thermal expansion markedly decreases. After the recoking steps, graphite prepared according to this invention has a Bacon Anisotropy Factor of less than about 1.25. The Bacon Anisotropy Factor (BAF) is the ratio of across grain coefficient of thermal expansion to with grain coefficient of thermal expansion.

In the recoking steps, the ground filler coke is combined with thermoplastic pitch and a solvent such as benzene or toluene which causes the pitch to evenly coat the particles. These blending steps, generally about 30 vol. parts of pitch per 100 vol. parts of filler coke, are preblended with about 130 vol. parts of solvent. The mixture is heated in an inert atmosphere at a temperature of about 505°–525° C. with 510° C. preferred.

After the recoking steps, bindering is performed followed by a surface plasticizing step which reduces the size of interparticle voids in the finished product. Bindering is performed by grinding the coke to particles less than about 2000 micrometers and mixing with thermoplastic pitch. For this step about 80/20 particle/pitch volume ratio is preferred. The preferred pitch for this step is a medium coal tar pitch such as 30 M pitch available from Allied Chemical Corporation. A slightly higher yield of carbon is obtained when coal tar pitches are used for this step as compared to petroleum pitches. The binder/coke mixture is mixed in a solvent such as benzene, toluene, etc. in the same manner as above until at least about 90% of the solvent has evaporated. At this point the mixture is heated in inert or reducing atmosphere to 300°–350° C. for about 1 hour to cause the chemical reaction to occur between the pitch and the coke. The resulting mass is ground and mixed with thermoplastic pitch about 90/10 particle pitch ratio in a 1:1 ratio with a solvent such as benzene or toluene containing about 1.5–2 wt.% of a plasticizer, for example an organonitro compound such as nitrobenzene or nitromethane. This plasticizing effect is described in report ORNL-4782, Molten Salt Reactor Program, pp. 144–148 available from National Technical Information Service, Springfield, Va. After mixing, the resulting material is dried, reground and molded at about 100°–110° C. under 200–2000 psig pressure to provide an article of more than 85% theoretical density with bulk densities of 90–93% theoretical readily obtainable. The molded article is then baked under restraint (to hold the material together as the binder softens) to about 800°–850° C. over a period of several days in an inert or reducing atmosphere to provide a coke article, having a bulk density of 75-85% theoretical.

According to this invention, it has been found that substantial improvements in bulk density of graphic articles can be achieved with a two-step pressure impregnation process. This pressure impregnation process is useful for impregnating any coke article prior to graphitization and is particularly desirable for impregnating cokes containing 1-3 wt.% sulfur which experience a reduction in bulk density as a result of puffing. Both steps of the impregnation process are performed in inert or reducing atmosphere at 200-2000 psig with 1500 psig preferred. In the first step a coke article is heated in contact with a thermoplastic pitch at 250°-300° C. for at least 4-10 hours. A minimum in the viscosity occurs in this temperature range and the thermoplastic impregnant flows into the open pores of the coke article. In the second step the temperature is increased to within the range of 450°-485° C. In this temperature range the thermoplastic impregnant is transformed to intermediate highly polymerized mesophase compounds which yield high carbon residues integrated within the structure. The physical properties of the ultimate graphite reflect maximum improvements from the increased density. The two-stage impregnation step of this invention yields about 70% of the total carbon in the impregnant compared to only about 45% yield using the 250°-300° C. impregnation step alone. The 450°-485° C. temperature range is critical. Below 450° C. the impregnant does not transform adequately to produce high carbon yields and above 485° C. the impregnant begins to pyrolyze under pressure and does not soften upon rebaking, causing either cracking upon reheating or providing little improvement in mechanical properties.

After the impregnation step, the article is heated in inert or reducing atmosphere for sufficient time to carbonize the impregnant providing a coke article ready for graphitization. This coke article is then heated to above about 3100° C., preferably 3150° C. for at least 15 minutes to graphitize the article. At a temperature between about 1500°-1700° C. puffing occurs due to the sudden release of sulfur from the article. Graphitization can be performed by conventional heating rates of about 3° C. per minute. It has been found, however, that the thermal stress resistance of the graphite of this invention is enhanced still further if the heating rate is increased to at least about 10° C. per minute over the range from about 1400° C. to a temperature above the puffing temperature. Heating slowly to 1400° C. minimizes the differential of shrinkage from thermal gradients and pyrolysis. After essentially complete dehydrogenation has occurred at 1400° C. the heating rate can be increased without damage to enhance the sulfur puffing effect. The high heating rate over the temperature range at which puffing occurs has been found to both increase the fracture strength and thermal stress resistance and decrease the thermal conductivity. As used herein the term "thermal stress resistance" is defined as the quotient of fracture strain (%) divided by the coefficient of thermal expansion (°C.$^{-1}\times 10^{-6}$).

Table I shows a comparison of grahites prepared according to the process of this invention and prior art graphites. It is seen that not only is the tensile strength improved but the fracture strain and thermal stress resistance are drastically improved. The following Example demonstrates the preferred method for carrying out the process of this invention.

A-240 petroleum pitch containing about 2% sulfur is coked in inert atmosphere to 510° C.±10° C. by the following heating schedule: heat to 300° C. at maximum heating rate; 300°-350° C. in ten hours; 350°-450° C. in two hours; 450°-510° in 10 hours and hold at 510° C. for 16-24 hours. Upon coking the sulfur level is reduced to about 1.6-1.75%. The hydrogen level is 4-5%. This coke is ground and sized to less than 90 micrometers with larger particles reground to provide a mean particle size of about 30 micrometers. A mixture of 75 wt.% particles to 25 wt.% A-240 pitch is mixed in a 1:1 ratio of solvent (benzene) to pitch and powder until greater than 90% of the solvent has evaporated. The mixture is dried and recoked in inert atmosphere to 510° C. for 20-30, preferably 24 hours. The resultant coke is ground to a particle size of about 110-115 micrometers, however, particle size is not critical. The particles are combined with A-240 pitch in a 75/25 wt.% particle pitch ratio in a benzene solvent as above. The mixture is dried and recoked in inert atmosphere to 510° C. for 20-30, preferably 24 hours. The coke is again ground, particle size not being critical and combined with 30 1 M medium coal tar pitch available from Allied Chemical in a 80/20 wt.% particle pitch ratio. Mixing is carried out as above using a benzene solvent in a 1:1 ratio of solvent to particles and pitch. The mixture is dried and then heated to 300°-350° C., preferably 325° C. for about 1 hour in inert atmosphere to cause a chemical reaction to occur between the coke and the pitch. The resultant material is reground and then again mixed with A-240 pitch in a 90/10 particle/pitch ratio and mixed with a benzene solvent in a 1:1 ratio, the benzene solvent containing about 2% nitrobenzene plasticizer. Mixing is carried out until about 90% of the solvent is evaporated. The material is dried and reground, again particle size not being critical, and molded at 100°-110° C. in a closed die (no inert atmosphere needed) at 1500 psig to provide a molded article of about 90-95% theoretical density. The molded article is then baked in inert atmosphere to 800°-850° C. under restraint over a 3-5 day heating cycle. The heating cycle should be carried out in 3 stages with the 300°-650° C. heating carried out at about one-half the rate of heating up to 300° C. and heating from 650°-850° C. After baking, the bulk density decreases to about 75-85% theoretical. The baked article is then impregnated with A-240 pitch. Impregnation is preferably carried out by placing the coke article in a pressure vessel along with sufficient granulated pitch to completly cover the article when the pitch is melted. The pressure vessel is sealed, a vacuum drawn, and the vessel is heated to melt the pitch. After the pitch is melted, the vessel is pressurized with inert gas. Impregnation is performed by heating the article in contact with the pitch at about 300° C. at 1500 psig for about 4 to 10 hours. The temperature is then raised to 465°-485° 1 C., at 1500 psig, and held for 16-24 hours, preferably 20 hours. The article is then baked in inert atmosphere to 900° C. over about a 3-day period to carbonize the impregnant. The heating rate is not critical up to 300° C., however, the 300°-600° C. temperature increase should take place over about 30 hours followed by more rapid heating to 900° C. After rebaking the the article is again impregnated with A-240 pitch using the same two-step impregnation process. After rebaking the article is graphitized by heating to greater than 3150° C. in inert atmosphere and holding for 15 minutes. The sandard heating rate of 3° C. per minute may be used all the way to 3150° C. Alternately, the heating can be carried out at 3° C. per minute to 1400° C., then increasing the heating rate to 20° C. per minute up to 3150° C. To avoid damage to the article the heating rate should not exceed about 25° 1 C. per minute.

TABLE I

|  | ATS-S | Grade 994 | This Invention |
|---|---|---|---|
| Tensile Strength, PSI |  |  |  |
| With grain | 5250 | 5900 | 6400 |
| Across grain | 4250 | 4190 | 5680 |
| Fracture Strain, % |  |  |  |
| With grain | 0.44 | 0.55 | 1.07 |
| Across grain | 0.55 | 0.71 | 1.04 |
| 1000° C. CTE, °C.$^{-1}$ × 10$^6$ |  |  |  |
| With grain | 3.5 | 3.4 | 4.0 |
| Across grain | 4.9 | 4.8 | 4.9 |
| Thermal Stress Resistance % °C.$^{-1}$ × 10$^6$ |  |  |  |
| With grain | .13 | .16 | .27 |
| Across grain | .11 | .15 | .21 |

Table II presents the properties of several graphites prepared from A-240 pitch according to the procedure of the Example having various sulfur contents prior to the molding step. The graphitization was performed in inert atmosphere either by heating at 3° C. per minute to 3200° C. and holding for 15 minutes, or by heating at 3° C. per minute to 1400° C., at 20° C. per minute to 3200° C. and holding for 15 minutes. The effect of graphitization rate on the puffing phenomenon was described by Tucker, Loch, Stecker, and Joo at the Thirteenth Bienniel Carbon Conference, Irving Calif., 1977.

In Table II it is shown that graphite prepared according to this invention has a density at least 1.75 gram-cm$^3$, a fracture strain (either with grain or across grain) at least 1.00%, a coefficient of thermal expansion (1000° C.) of less than 5.5×10$^{-6}$° C.$^{-1}$, a BAF less than 1.25 and a thermal stress resistance of at least 0.2%/(°C.$^{-1}$×10$^6$). The grahite prepared by increasing the heating rate during graphitization to greater than 10° C./minute above 1400° C. has a density of at least 1.75, a fracture strain of at least 1.09, a coefficient of thermal expansion (1000° C.) of less than 5×10$^{-6}$° C.$^{-1}$, a BAF less than 1.25 and a thermal stress resistance at least 0.24%/(°C.$^{-1}$×10$^6$).

An additional desirable property of the graphite of this invention is that the structure is so regular that flaw detection measurements by sonic pulse echo procedures are readily made. This material has a very low sonic attenuation compared to other grades to graphite. The low attenuation and low background noise has allowed disparity flaws of 0.25 mm diameter or greater to be detected to depths of 130 millimeters.

What is claimed is:

1. A method for fabricating a graphite article comprising the steps of:
    (a) providing a first coke article containing 1-3 wt.% sulfur and no added puffing inhibitors;
    (b) impregnating said first coke article with a thermoplastic pitch by first heating said first coke article in contact with said thermoplastic pitch at a temperature within the range of 250°-300° C. at a pressure within the range of 200-2000 psig for at least 4-10 hours, and then heating said article at a temperature within the range of 465°-485° C. at a pressure of 200-2000 psig for about 16-24 hours to provide an impregnated article;
    (c) heating said impregnated article for sufficient time to carbonize the impregnant to provide a second coke article; and
    (d) graphitizing the second coke article at a temperature above the temperature at which puffing occurs.

2. The method of claim 1 wherein said graphitization step is carried out above 3100° C.

3. The method of claim 1 wherein said second coke article is heated at a heating rate of at least 10° C. per minute from about 1400° C. to a temperature above the temperature at which puffing occurs.

4. The method of claim 1 wherein said first coke article contains about 1.60-1.75% sulfur.

5. The graphite article prepared by the method of claim 2 characterized by a density at least 1.75 gm/cm$^3$, a fracture strain at least 1%, a 1000° C. coefficient of thermal expansion less than 5.5×10$^{-6}$° C.$^{-1}$ and a thermal stress resistance of at least 0.2%/(°C.$^{-1}$×10$^6$).

6. The graphite article prepared by the method of claim 3 characterized by a density at least 1.75 gm/cm$^3$, a fracture strain at least 1.09%, a 1000° C. coefficient of thermal expansion less than 5×10$^{-6}$° C.$^{-1}$ and a thermal stress resistance of at least 0.24%/(°C.$^{-1}$×10$^6$).

7. The graphite of claim 5 further characterized by a Bacon Anisotropy factor less than 1.25.

8. The graphite of claim 6 further characterized by a Bacon Anisotropy factor less than 1.25.

9. A graphite article characterized by a density at least 1.75 gm/cm$^3$, a fracture strain of at least 1%, a 1000° C. coefficient of thermal expansion less than 5.5×10$^{-6}$° C.$^{-1}$, a thermal stress resistance of at least 0.2%/(°C.$^{-1}$×10$^6$) and a Bacon Anisotropy factor less than 1.25.

10. The graphite article of claim 9 characterized by a fracture strain of at least 1.09%, a 1000° C. coefficient of thermal expansion less than 5×10$^{-6}$, and a thermal stress resistance of at least 0.24%/(°C.$^{-1}$×10$^6$).

* * * * *

Table II

The Effect of Graphitization Rate on Physical Properties

| Filler Number | Sulfur Level (%) | Graphite Rate (°C./min) | Density (g/cm$^3$) | Bend Strength (MPa) WG/AG | Young's Modulus (GPa) WG/AG | Fracture Strain (%) WG/AG | 1000° C. CTE (°C.$^{-1}$ × 10$^6$) WG/AG | Thermal Stress Resistance (%/°C.$^{-1}$ × 10$^6$) WG/AG |
|---|---|---|---|---|---|---|---|---|
| 240-7-13 to 27 | 1.50 | 3 | 1.81 | 56.8/51.1 | 10.5/9.0 | 1.51/1.13 | 4.6/5.1 | .25/.25 |
| 240-7-7 | 1.52 | 3 | 1.86 | 59.4/53.9 | 11.6/9.5 | 1.04/1.19 | 4.4/5.3 | .24/.22 |
| 240-7-7 | 1.52 | 20 | 1.77 | 60.3/52.2 | 10.6/8.7 | 1.12/1.15 | 3.8/4.3 | .29/.29 |
| 240-7-9 | 2.70 | 3 | 1.80 | 52.7/45.5 | 9.4/8.1 | 1.06/1.06 | 3.9/4.7 | .27/.22 |
| 240-7-9 | 2.70 | 20 | 1.75 | 57.2/42.1 | 10.1/7.4 | 1.13/1.09 | 3.8/4.3 | .30/.25 |
| 240-7-10 | 2.65 | 3 | 1.79 | 54.1/44.2 | 9.8/9.4 | 1.05/1.00 | 4.2/5.0 | .25/.20 |
| 240-7-10 | 2.65 | 20 | 1.78 | 59.0/47.4 | 10.1/7.7 | 1.12/1.16 | 4.0/4.7 | .28/.25 |
| GLRC-13,19,21 | 1.35 | 3 | 1.89 | 61.4/57.1 | 11.4/10.2 | 1.08/1.12 | 4.8/5.3 | .22/.21 |
| GLRC-22 | 1.35 | 20 | 1.80 | 61.1/57.1 | 10.4/8.4 | 1.13/1.18 | 4.4/4.8 | .26/.24 |